(12) United States Patent
Elliott et al.

(10) Patent No.: US 12,146,761 B2
(45) Date of Patent: Nov. 19, 2024

(54) INDOOR ROUTE MAPPING

(71) Applicant: NCR Voyix Corporation, Atlanta, GA (US)

(72) Inventors: Ryan Scott Elliott, Acworth, GA (US); John Edward Haney, Rosemount, MN (US); Kip Oliver Morgan, Atlanta, GA (US); Andrew Michael Reusche, Roswell, GA (US)

(73) Assignee: NCR Voyix Corporation, Atlanta, GA (US)

( * ) Notice: Subject to any disclaimer, the term of this patent is extended or adjusted under 35 U.S.C. 154(b) by 439 days.

(21) Appl. No.: 17/489,628

(22) Filed: Sep. 29, 2021

(65) Prior Publication Data
US 2023/0099770 A1 Mar. 30, 2023

(51) Int. Cl.
*G01C 21/00* (2006.01)
*G06F 3/01* (2006.01)

(52) U.S. Cl.
CPC ....... *G01C 21/383* (2020.08); *G01C 21/3859* (2020.08); *G06F 3/011* (2013.01)

(58) Field of Classification Search
CPC .............. G01C 21/383; G01C 21/3859; G01C 21/206; G01C 21/3407; G01C 21/3837; G06F 3/011
See application file for complete search history.

(56) References Cited

U.S. PATENT DOCUMENTS

| | | | |
|---|---|---|---|
| 2012/0154619 A1* | 6/2012 | Lee | G06V 30/142 |
| | | | 348/222.1 |
| 2018/0005309 A1* | 1/2018 | Croy | G06Q 30/0639 |
| 2018/0247330 A1* | 8/2018 | Duerr | G06Q 30/0239 |
| 2019/0156573 A1* | 5/2019 | Palos | G06T 19/006 |
| 2019/0197759 A1* | 6/2019 | Huang | G06T 15/005 |
| 2020/0302510 A1* | 9/2020 | Chachek | G06Q 30/0639 |
| 2020/0393263 A1* | 12/2020 | Kleen | G01C 21/3655 |

FOREIGN PATENT DOCUMENTS

CN 107782314 A * 3/2018 ........... G01C 21/206

* cited by examiner

*Primary Examiner* — Khoi H Tran
*Assistant Examiner* — Nhi Q Bui
(74) *Attorney, Agent, or Firm* — Schwegman Lundberg & Woessner. P.A.

(57) ABSTRACT

An indoor location is mapped into a grid comprising grid cells, each cell associated with items or objects detected as being present in the corresponding cell. The grid, grid cells, and linked items and/or objects are generated and updated using an Augmented Reality (AR) algorithm that maps a physical environment into cells and measures distances and directions within the environment relative to each cell. Walking paths (routes) to the items within the indoor location are generated using the grid information. As a user walks a path, the user's position within the indoor location is mapped and tracked to the cells and the path revised based on the user's actual position. A user device provides video via an AR application to track the user's position; a rendering of the position and path are superimposed within the video being viewed by the user on the user-operated device.

8 Claims, 3 Drawing Sheets

310

OBTAIN A LIST OF ITEM CODES (IC) ASSOCIATED WITH AN ORDER

320

OBTAIN AN AR-GENERATED DATA STRUCTURE (DS) FOR A STORE ASSOCIATED WITH ITEMS IDENTIFIED BY THE IC, THE AR-GENERATED DS COMPRISES A GRID (G) AND CONNECTED GRID CELLS (C) THAT MAP TO A PHYSICAL ENVIRONMENT (PE) OF THE STORE AND STORE IC FOR STORE ITEMS LOCATED WITHIN EACH C

330

GENERATE AT LEAST ONE WALKING PATH (P) THROUGH THE STORE TO OBTAIN THE ITEMS USING THE IC, THE STORE IC, AND THE AR-GENERATED DS

340

PROVIDE THE P TO AN AR INTERFACE WHEN A USER ASSOCIATED WITH THE ORDER SCANS AN ANCHOR POINT OBJECT (OBJ) LOCATED WITHIN THE PE OF THE STORE UPON ENTRY INTO THE STORE USING AN AR APP OF A USER-OPERATED DEVICE (D)

350

RECEIVE A VIDEO (V) THAT IS CAPTURED BY THE AR APP AND THAT IS PROVIDED BY THE AR INTERFACE AS THE USER TRAVERSES THE STORE; AND
TRACK CURRENT LOCATIONS (CL) OF THE USER WITHIN THE SORE AS THE USER TRAVERSES THE STORE RELATIVE TO THE P USING THE AR-GENERATED DS

351

ADJUST THE P BASED ON ONE OR MORE DEVIATIONS FROM THE P IN THE CL; AND
PROVIDE AT LEAST ONE ADJUSTED P TO THE AR INTERFACE FOR DELIVERY TO THE AR APP

300

380

RECORD AN ELAPSED TIME (ET) THAT THE USER REQUIRED TO WALK THE P; AND ASSOCIATE THE ET WITH THE P AND THE STORE IC THAT CORRESPOND TO THE IC OF THE ORDER

381

MAINTAIN PATH-BASED (PB) FREQUENCY COUNTERS (FC) WITH THE P AND OTHER OTHER P OF OTHER ORDERS;
MAINTAIN ITEM-BASED (IB) FC WITH THE STORE IC THAT CORRESPOND TO THE IC AND OTHER STORE IC FOR OTHER ORDERS; AND
PROVIDE AN INTERFACE TO THE STORE FOR REPORTING, SEARCHING, AND ANALYZING THE ET AND THE FC

370

RECORD A V CAPTURED THAT IS CAPTURED BY THE AR APP AND THAT IS PROVIDED BY THE AR INTERFACE AS THE USER TRAVERSES THE STORE; AND
PROVIDE THE V, THE IC ASSOCIATED WITH THE ORDER, THE P, AND AN ACTUAL P OF THE USER THROUGH THE STORE TO PICK THE ITEMS TO AN AR MAPPER FOR UPDATING THE AR-GENERATED DS

360

GENERATE, BY THE AR INTERFACE, AN AR OBJ THAT VISUALLY DEPICTS THE G AND THE C THAT CORRESPOND TO THE P; AND
CAUSE, BY THE AR INTERFACE THE AR APP TO SUPERIMPOSE THE AR OBJ ONTO A V BEING VIEWED ON THE D BY THE USER AS THE USER TRAVERSES THE STORE

FIG. 3

INDOOR ROUTE MAPPING

BACKGROUND

Tracking locations indoors can be difficult for a variety of reasons. Bluetooth® beacons are inexpensive but lack sufficient accuracy to be used practically in the real-world. Overhead cameras and lighting systems provided better accuracy but are expensive to deploy with computer-vision based technologies and they typically require substantial hardware and software resource investments/upgrades.

If a shopper's location could be accurately tracked within a store relative to items of the store, then routes for more efficient paths to the shopper's items can be provided to the shopper without requiring assistance of store staff. In fact, an efficient indoor tracking and routing system may even increase revenues of the store since shoppers will be capable of locating items, purchasing desired items, and not leaving the store frustrated without the items or leaving the store with the items after spending an unexpected amount of time in locating the items.

Additionally, new employees would be significantly more productive in locating items for shoppers, in restoring items to the shelves of the store that are returned or not purchased at checkout by the shoppers, and in re-stocking items on the shelves with an efficient indoor tracking and routing system.

Thus, there is a need for efficient indoor tracking and routing techniques that are accurate, cost efficient, and easy to integrate at any given indoor location.

SUMMARY

In various embodiments, a system and methods for indoor route mapping are provided.

According to an embodiment, a method for indoor route mapping is presented. An Augmented Reality (AR) mapping session is established with a user who is operating a user device that streams a video. A physical environment captured for an indoor location in the video is mapped to a data structure that comprises a grid and grid cells. Items or objects within each grid cell are identified from the video and the items or the objects are associated with the corresponding grid cell within the data structure as the user travels around the indoor location with the user device. The data structure is provided for route generation of routes or paths to one or more of the items or the objects when the mapping session ends.

BRIEF DESCRIPTION OF THE DRAWINGS

FIG. 3 is a diagram of another method for indoor route mapping, according to an example embodiment.

DETAILED DESCRIPTION

Figure 1:
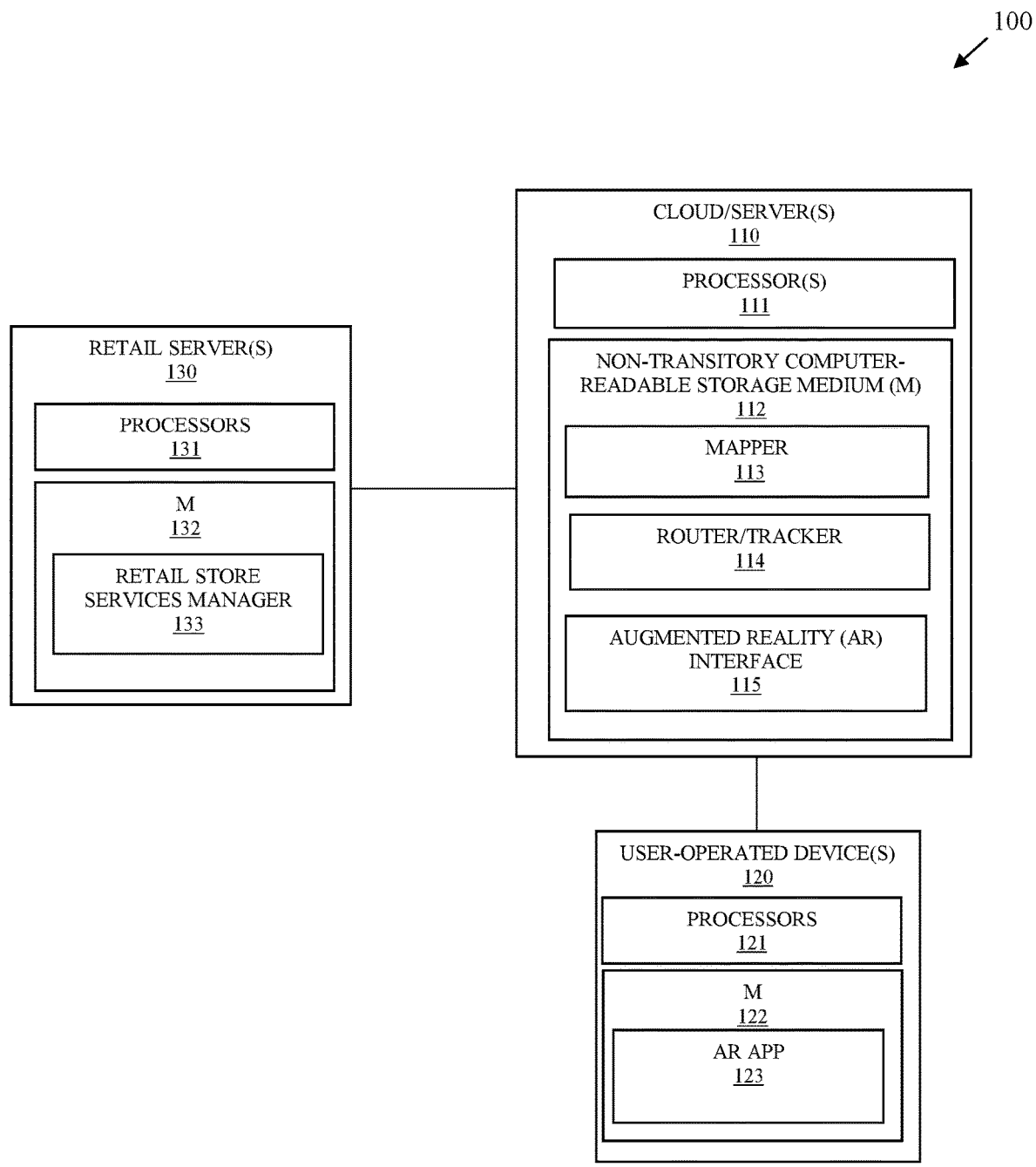
FIG. 1 is a diagram of a system for indoor route mapping, according to an example embodiment.

FIG. 1 is a diagram of a system/platform 100 for indoor route mapping, according to an example embodiment. It is to be noted that the components are shown schematically in greatly simplified form, with only those components relevant to understanding of the embodiments being illustrated. Furthermore, the various components (that are identified in system/platform 100) are illustrated and the arrangement of the components are presented for purposes of illustration only. It is to be noted that other arrangements with more or less components are possible without departing from the teachings of providing indoor route mapping, presented herein and below.

System/platform 100 (herein after just "system 100") provides a processing environment by which a given indoor location can be efficiently mapped using an Augmented Reality (AR) based interface and an AR mobile application for purposes of crowdsourcing (over time) each available walking path within the indoor location. The indoor location is broken down during a mapping session into a collection of interconnected adjacent squares of a grid similar to a chessboard. The grid cells (squares) are gradually populated as staff at the location or customers at the location traverse the indoor location until the squares of the grid are completely or nearly completely populated with item identifiers or object identifiers at each location based on images captured and/or codes scanned for the items and/or objects. Once the board grid for the location is populated to a threshold amount, staff or customers can use the AR mobile application for purposes of receiving efficient dynamic generated paths or routes through the indoor location to items or objects at the indoor location while the positions of the staff or customers are tracked and mapped in real time to the grid cells with remarkable accuracy by using an integrated camera of staff or customer-operated devices as the staff or customers traverse the indoor location to the items or objects. Additionally, professional pickers that pick online orders or staff that fulfill online orders of the location may also utilize the dynamic routing and tracking for purposes of efficiently picking the items at the indoor location.

As used herein, the terms "customer," "consumer," "user," "staff member," "employee," and/or "picker" may be used interchangeably and synonymously herein and below. This refers to an individual that has is either engaged in a recording or mapping session with system 100 and/or is engaged in routing session with system 100.

The phrase "Augmented Reality (AR)" is intended to mean a blending of actual physical objects present within an environment of a user and artificially generated objects that are superimposed into the environment within a video as the video is captured in real time by a camera of a user-operated device as the user operates and travels with the device.

An "object" is intended to mean an electronically identified real-world structure (shelf, aisle, door, chair, terminal, desk, display, device, etc.) or a real-world item that is identified within the physical environment of the user from a video of the user-operated device for purposes of identification during an AR session (e.g., a physical/real-world object). An object may also be an AR-rendering of a physical object ("AR object") that is independently generated and provided within the video during the user's AR session but that is not present or is not present in a rendered format that is provided to the user during the AR session within the user's physical environment.

An "AR mapping session" refers to a communication session during which the user is actively operating a user-operated device with the AR app operating and the camera of the device capturing images of the user's physical environment. During the AR mapping session the camera upon the direction of the user and/or passively unbeknownst to the user captures item codes for items and/or identifies objects from the video and maps the items and objects to anchor points or grid cells of a grid for a given location. The locations of the items and objects relative to one another and relative to the anchor points assists in gradually generating and populating the grid for the given location.

An "AR routing session" refers to a communication session during which the user is provided a route or path to items at the given location using the grid and the real-time video captured by the user-operated device as the user travels the route through the location to the items. One or more AR generated renderings of the items or objects and/or anchor points may be rendered within the video to the user as the user traverses the route. Any objects or anchor points detected through the video within the physical environment may be used to dynamically improve or update the grid, such that the grid is continuously being improved and updated during each AR routing session.

System 100 comprises a cloud/server 110, a plurality of user-operated devices 120, and one or more retail servers 130 (optional).

Cloud/Server 110 comprises at least one processor 111 and a non-transitory computer-readable storage medium 112. Medium 112 comprises executable instructions for a mapper 113, a router/tracker 114, and an AR interface 115. The executable instructions when provided to and executed by processor 111 from medium 112 cause processor 111 to perform the processing discussed herein and below for mapper 113, router/tracker 114, and AR interface 115.

Each user-operated device 120 (hereinafter just "device 120") comprises at least one processor 121 and a non-transitory computer-readable storage medium 122. Medium 122 comprises executable instructions for an AR application (app) 123. The executable instructions when provided to and executed by processor 121 from medium 122 cause processor 121 to perform the processing discussed herein and below for AR app 123.

Each optional retail server 130 comprises at least one processor 131 and a non-transitory computer-readable storage medium 132. Medium 132 comprises executable instructions for a retail store services manager 133. The executable instructions when provided to and executed by processor 131 from medium 132 cause processor 131 to perform the processing discussed herein and below for optional retail store services manager 133.

Initially, system 100 is configured through 1 or more AR mapping sessions. This entails the user operating device 120 with AR app activated and connected to AR interface 115. Real-time video captured by an integrated camera of device 120 streams the video during the session as the user walks a given indoor location (e.g., a retail store). The session begins by the user (e.g., staff or employee of the store) directing the focus of the camera to a starting anchor point located at an ingress or entry point into the indoor location. The anchor point is identified through a Quick Response (QR) code or barcode detected at the start of the AR mapping session in the video by interface 115. The code is identified by mapper 113 as a starting point to begin the mapping session. It is noted that the starting point can be any object and does not have to be a code, such as a digital display, a printed display, a bank of carts, etc.

When mapper 113 is providing the anchor starting point for the AR mapping session, mapper 113 instructs interface 115 to begin recording the video during the AR mapping session. The anchor starting point is where a shopper or a picker would begin a trip through the indoor location. It is noted that there may be multiple starting points throughout the indoor location, such as entry into the store area from an employee or backroom area that houses inventory for stocking in the store, a fire escape or back door entry door for employees, a breakroom, etc.

When the recording begins for the AR mapping session, mapper 113 initializes initiates an AR algorithm responsible for measuring distance and mapping objects in the surrounding physical environment being captured during the video recording relative to the anchor starting point and further relative to additional anchor points identified in the video as the user moves away from the initial anchor starting point. This ensures that the indoor location can be visualized as a grid or chessboard generated and maintained by mapper 113 during the recording of the video. The user then walks to any location within the indoor along a known walking path, mapper 113 generates and connects the grid cells or tiles recorded along the path to populate the grid.

The AR algorithm that is processed by mapper 113 for the AR mapping session is similar to what biometric-based algorithms (such as facial identification or touch identification) do for authentication in that they train on various detected visual features during a training session. Furthermore, the AR algorithm is similar to AR based gaming applications that require the gamer to capture video of the physical surroundings in which the gamer will be playing the game.

As the user walks a path during the AR mapping session, the grid being populated is superimposed on a small portion of video that the user sees in the video as the user travels the path and the grid cells or tiles being walked are highlighted or lit up so that the user sees how the path is being generated and mapped by mapper 113 during the session. For example, if a user travels from the anchor location to a second location, mapper 113 provides the grid points detected to interface 115. Interface 115 generates an AR object for the grid and the grid cells and renders an AR object within the user video that the user sees while walking from the anchor location to the second location, the user sees a grid with two connected cells (tiles) being connected and highlighted within the grid in the direction that the user is walking.

Additionally, as the user walks the path, the user may be instructed to stop every few feet (configurable distance such as 10 feet) and capture though the video additional objects visible at that location. For example, the user may scan barcodes of items by focusing the video on item barcodes. Each different item may have its barcode recorded. Mapper 113 records the items at each grid cell and maps their item codes to the corresponding grid cell. Each grid cell corresponds the configurable distance in which the user is instructed to stop. Mapper 113 may also detect other objects within a given grid cell, such as a start of an aisle and end of an aisle, a wall, a height of a shelf, a door, a water fountain, etc.

As the grid or board is being populated, the user gets into spaces within the indoor location that are considered by mapper 113 to be walkable and connected to additional grid cells or tiles that can be walked between. This allows mapper 113 to compute walking paths between different grid cells or tiles, assuming a valid path is available. Once the user walks the entire store, stopping at the configurable distance and capturing through the video item codes and other objects at each grid cell. Mapper stores the grid, grid cells, paths, and item codes and objects at each grid cell for access and processing by router/tracker 114 during AR routing sessions for users.

The initial AR mapping session does not have to be comprehensive; rather, multiple AR mapping sessions can be processed by mapper 113 to gradually over time develop a comprehensive grid, grid cells, paths, and item codes and objects at each grid cell. For example, stockers can initiate AR app 123 as the re-stock items within the store during AR mapping sessions causing mapper 113 to identify potentially new grid cells, items within specific grid cells, and/or updating item codes for items previously recorded in one grid cell to be associated with a different grid cell.

Still further, even when an AR routing session is initiated, router/tracker 114 records the grid cells walked by the user (which may be a customer, staff, stocker, or picker) along a walking path for a route generated by router/tracker 114 and feeds the video to mapper 113 either in real time or at the end of the AR routing session. This allows mapper 113 to analyze the walked path in view of the stored grid, grid cells, and objects and items known to be present within each walked grid cell such that mapper 113 can update that information to improve the accuracy by continuously updating and further populating the grid, the grid cells, walking paths, and the items and objects within the grid cells of the walking paths. Thus, a mini or lite AR mapping session may be processed by mapper 113 during or after each AR routing session. Essentially, the grid, grid cells, walking paths, and the items and objects present within each grid cell are crowdsourced continuously such that as items are moved, shelves rearranged, and objects moved, this information is updated dynamically, and accuracy is continuously improved for AR routing sessions.

During an AR routing session, a user provides a list of items desired by the user through a user-facing interface of AR app 123. This list may comprise a single item or a plurality of items. Furthermore, the list may be obtained a third-party service based on an order number linked to a user-identifier. In some cases, the order number is obtained directly by router/tracker 114 through retail store services manager 133 based on a user-provided retailer order number and/or a retailer-maintained user identifier for the user. In fact, the list may be obtained through a variety of mechanisms that link order numbers for a specific retailer and store or that link orders to a specific user identifier.

Once the list is obtained at the start of the AR routing session, router/tracker 114 generates an efficient walking path through the indoor location based on the item identifiers for the items in the list and based on the current existing grid, grid cells, walking paths, and item identifiers and objects known to be present within each grid cell.

The walking path is provided to interface 115 and interface generates an AR object that comprises the grid and a connected set of grid cells through the grid to the items of the list, each connected set of grid cells highlighted or colored within the grid. The interface 115 superimposes the AR object onto the video being viewed by the user when the user scans or is detected through the video to be present at the anchor starting point (entryway of the store/indoor location). Furthermore, as the user walks along the walking path to pick the items from the list, the video is provided by interface 115 to router/tracker 114. Router/tracker 114 monitors in real time where the user is at within the grid relative to the walking path and notes any real-time deviations made by the user with respect to the route/walking path. The deviations are recorded for evaluation by mapper 113 (as discussed above) and updates to the walking path generated by router/tracker based on the deviations. Adjustments to the walking path are communicated to interface 115 and interface 115 generates a modified AR object that is rendered on to the video being viewed by the user.

Thus, the user is continuously able to view the user's position within the grid relative to the walking path and is able to view a dynamically adjusted suggested revised walking path. Moreover, as the user picks items from the list, router/tracker 114 notes the picked item based on either a user scan of the item code for the item or based on the visual features of the item detected within the video. Any identified item from the list that was not in the expected location within the grid cells is highlighted or flagged for dynamic adjustments in the grid cell information by mapper 113 following the user's AR routing session. Any item identified from the list in an expected location with the grid cell is removed from the list of items that are being picked.

In an embodiment, each walking path for a given AR routing session is also timed based on time stamps in the video. These time stamps may be used by router/tracker 114 as metrics for selecting an optimal path to pick items in a list when multiple paths are available to pick the items. Router/Tracker 114 may further associate a frequency count for each walking path indicating how many users traversed that walking path through the indoor location. Each walking path may further be associated with item counts for a total number of specific items picked for that walking path. These metrics may be used to generate reports or customized reports provided to retail store services manager 113 for purposes of a retailer determining efficient or more revenue generating locations for items within the store (indoor location) or more efficient or revenue generating layouts of shelves, aisles, display cases, and/or walking paths through the store.

In an embodiment, user-operated device 120 is a phone, a wearable processing device (such as glasses, goggles, watches, etc.), or a tablet computer.

In an embodiment, mapper 113, router/tracker 114, and AR interface 115 are subsumed into and are integrated components or modules of retail server 130.

In an embodiment, cloud/server 110 further comprise an Application Programming Interface (API) to third-party picking services, such as Instacart®, a specific retailer's picking service (Walmart®, Kroger®, Amazon®, etc.), Shipt®, etc. The API allows a specific list of items for a given order or a given user (customer or picker) to be obtained by router/tracker 114 for a given indoor location (store) associated with the order.

In an embodiment, AR app 123 is integrated into and subsumed into an existing third-party picking service's ordering mobile application.

In an embodiment, the indoor location is associated with a retail store, a warehouse, a museum, or an entertainment/event venue.

Figure 2:
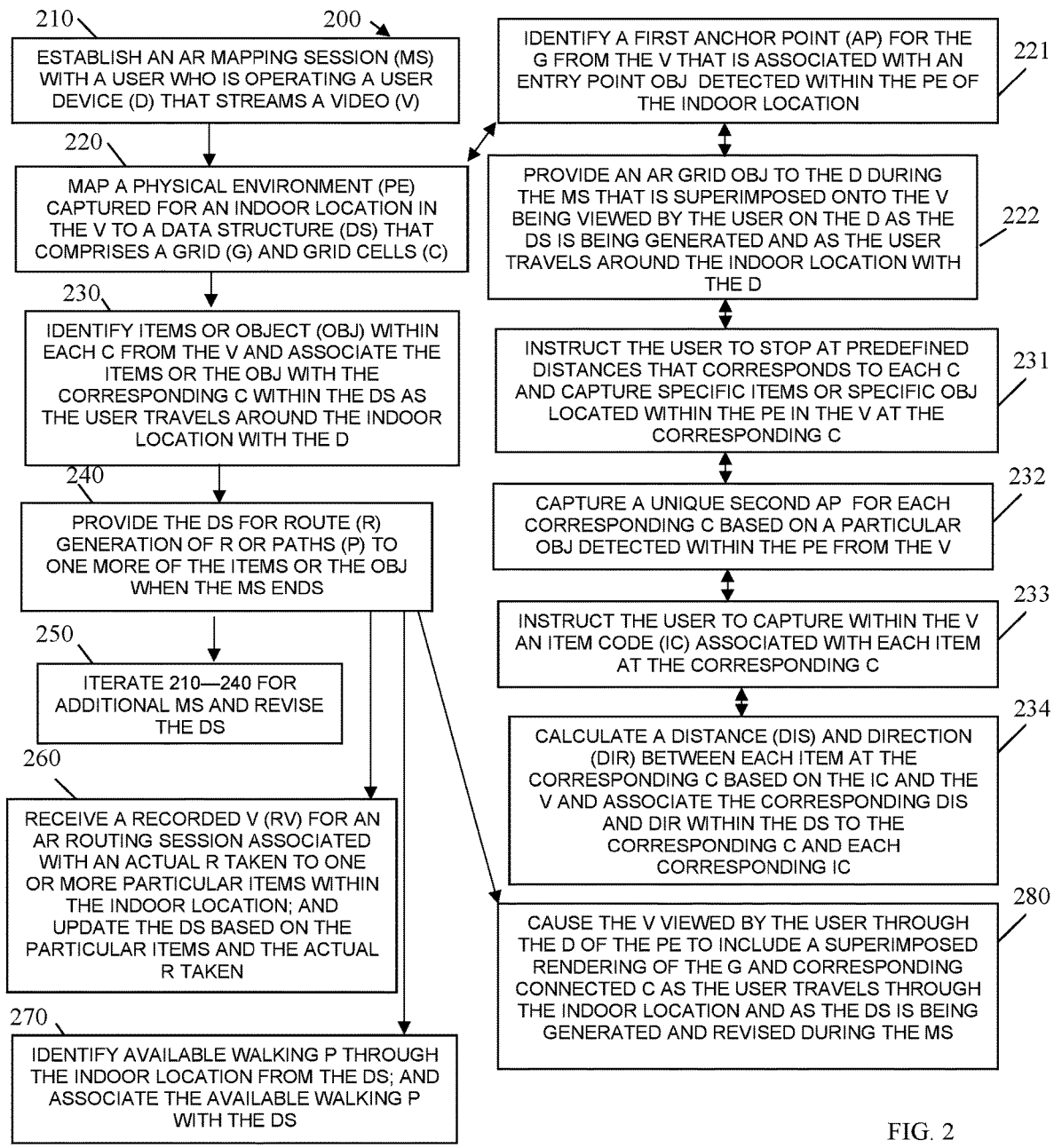
FIG. 2 is a diagram of a method for indoor route mapping, according to an example embodiment.

The above-referenced embodiments and other embodiments are now discussed within FIGS. 2-3.

FIG. 2 is a diagram of a method 200 for indoor route mapping, according to an example embodiment. The software module(s) that implements the method 200 is referred to as an "AR mapper." The AR mapper is implemented as executable instructions programmed and residing within memory and/or a non-transitory computer-readable (processor-readable) storage medium and executed by one or more processors of one or more devices. The processor(s) of the device that executes the AR mapper is specifically configured and programmed to process the AR mapper. The AR mapper may have access to one or more network connections during its processing. The network connections can be wired, wireless, or a combination of wired and wireless.

In an embodiment, the device that executes the AR mapper is cloud 110. Cloud 110 comprises a plurality of servers logically cooperating and accessible as a single server 110 (cloud 110).

In an embodiment, the device that executes the AR mapper is a server 110 that is separate from any given retail server 120.

In an embodiment, the AR mapper is all or some combination of 113, 114, and/or 115.

At 210, the AR mapper establishes an AR mapping session with a user who is operating a user-operated device 120 that stream video to the AR mapper or to an AR interface 115 associated with AR mapper during the AR mapping session.

At 220, the AR mapper maps a physical environment captured for an indoor location in the video to a data structure. The data structure comprises a grid and connected grid cells.

In an embodiment, at 221, the AR mapper identifies a first anchor point for the grid from the video that is associated with an entry point object detected within the physical environment of the indoor location. In an embodiment, the user scans a displayed code within the video to initiate the AR mapping session. In an embodiment, a known entry point object is detected automatically from the video when the user enters the indoor location causing initiation of the AR mapping session.

In an embodiment of 221 and at 222, the AR mapper provides an AR grid object to the user-operated device 120 during the AR mapping session that is superimposed onto the video being viewed by the users on the device 120 as the data structure is being generated and as the user travels around the indoor location with the device 120.

At 230, the AR mapper identifies items or objects within each connected grid cell from the video and the AR mapper associates the items or the objects with the corresponding connected grid cell within the data structure as the user travels around the indoor location with the device 120.

In an embodiment of 222 and 230, at 231, the AR mapper instructs the user to stop at predefined distances that correspond to each connected grid cell and capture specific items or specific objects located within the physical environment of the indoor location in the video at each corresponding connected grid cell.

In an embodiment of 231 and at 232, the AR mapper captures a unique second anchor point for each corresponding connected grid cell based on a particular detected objection within the physical environment from the video. Again, the user can focus the video being captured on a specific object to capture a code or AR mapper can automatically detect a specific type of object (shelf, aisle, etc.) and automatically use that object and the unique second anchor point.

In an embodiment of 232 and at 233, the AR mapper instructs the user to capture within the video an item code associated with each item at the corresponding connected grid cell being processed for the data structure as the user is traveling around the physical environment of the indoor location.

In an embodiment of 233 and at 234, the AR mapper calculates a distance and a direction between each item at the corresponding connected grid cell based on the item code and the video. The AR mapper associates the corresponding distance and the corresponding direction within the data structure to the corresponding connected grid cell and each corresponding item code.

At 240, the AR mapper provides the data structure for route generation or routes or paths to one or more items of the objects when the AR mapping session ends.

In an embodiment, at 250, the AR mapper iterates processing of 210-240 for one or more additional AR mapping sessions and revises or refines the data structure based on each AR mapping session.

In an embodiment, at 260, the AR mapper receives a recorded video for an AR routing session associated with an actual route taken to one or more particular items within the indoor location. The AR mapper updates the data structure based on the particular items and video that corresponds to the actual route taken.

In an embodiment, at 270, the AR mapper identifies available walking paths through the indoor location from the data structure and associates the available walking paths with the data structure.

In an embodiment, at 280, the AR mapper causes the video being viewed by the user through the device 120 to include a superimposed rendering of the grid and the corresponding connected grid cells as the user travels through the indoor location and as the data structure is being generated and revised during the AR mapping session.

FIG. 3 is a diagram of another method 300 for indoor route mapping, according to an example embodiment. The software module(s) that implements the method 300 is referred to as an "AR router/tracker." The AR router/tracker is implemented as executable instructions programmed and residing within memory and/or a non-transitory computer-readable (processor-readable) storage medium and executed by one or more processors of a device. The processors that execute the AR router/tracker are specifically configured and programmed for processing the AR router/tracker. The AR router/tracker may have access to one or more network connections during its processing. The network connections can be wired, wireless, or a combination of wired and wireless.

In an embodiment, the device that executes the AR router/tracker is cloud 110. In an embodiment, the device that executes the AR router/tracker is server 110.

In an embodiment, the AR router/tracker is all of or some combination of 113, 114, 115, and/or method 200 of FIG. 2.

The AR router/tracker presents another and, in some ways, enhanced processing perspective from that which was discussed above for cloud 110 and method 200.

At 310, the AR router/tracker obtains a list of item codes associated with an order.

At 320, the AR router/tracker obtains an AR-generated data structure (such as the data structure produced with method 200) for a store associated with items identified by the item codes. The AR-generated data structure comprises a grid and connected grid cells that map to a physical environment of the store and store item codes for store items located within each connected grid cell of the grid.

At 330, the AR router/tracker generates, derives, and/or identifies at least one waling path through the store to obtain the items using the item codes, the store item codes, and the AR-generated data structure.

At 340, the AR router/tracker provides the path to an AR interface 115 when a user associated with the order scan an anchor point object located within the physical environment of the store upon entry into the store using an AR app 123 of a user-operated device 120.

In an embodiment, at 350, the AR router/tracker receives a video that is captured by the AR app 123 and that is provided by the AR interface 115 as the user traverses the store along the path. The AR router/tracker also tracks current locations of the user within the store as the user traverses the store relative to the path using the AR-generated data structure and the video.

In an embodiment of 350 and at 351, the AR router/tracker adjusts the path based on one or more deviations from the path detected in the current locations being tracked from the video and the AR-generated data structure. Furthermore, the AR router/tracker provides at least one adjusted path to the AR interface 115 for real-time delivery to the AR app 123.

In an embodiment, at 360, the AR interface 115 generates an AR object that visually depicts the grid and the connected grid cells that correspond to the path. The AR interface 115 causes the AR app 123 to superimpose the AR object onto the video being viewed on the user-operated device 120 by the user as the user traverses the store.

In an embodiment, at 370, the AR router/tracker records a video that is captured by the AR app 123 and that is provided by the AR interface 115 as the user traverses the store. The AR router/tracker provides the video, the item codes associated with the order, the path, and an actual path or the user to pick the items to an AR mapper 113 for updating the AR-generated data structure.

In an embodiment, at 380, the AR router/tracker records an elapsed time that the user required to walk the path using time stamps in video captured by the AR app 123 as the user traverses the store. The AR router/tracker associates the elapsed time with the path and the store item codes that correspond to the item codes of the order.

In an embodiment of 380 and at 381, the AR router/tracker maintains path-based frequency counters with the path and other paths of other orders. The AR router/tracker also maintains item-based frequency counters with the store item codes that correspond to the item codes of the order and that correspond to other store item codes associated with other orders. The AR router/tracker further provides an interface to the store for reporting, searching, and analyzing the elapsed times, the path-based frequency counters, and the item-based frequency counters. This permits the store to determine optimal item locations and arrangements of shelves, aisles, and other structures based on analyzing or mining the metrics maintained by AR router/tracker through the interface.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    establishing an Augmented Reality (AR) mapping session with a user who is operating a user device that streams a video;
    mapping a physical environment captured for an indoor location in the video to a data structure that comprises a grid and grid cells, wherein mapping further includes:
        identifying a first anchor point for the grid from the video that is associated with an entry point object detected within the physical environment of the indoor location;
        providing an AR grid object to the user device during the AR mapping session that is superimposed onto the video being viewed by the user on the user device as the data structure is being generated and as the user travels around the indoor location with the user device;
    identifying items or objects within each grid cell from the video and associating the items or the objects with a corresponding grid cell within the data structure as the user travels around the indoor location with the user device, wherein identifying further includes:
        instructing the user to stop at predefined distances that corresponding to each grid cell and capture specific items or specific objects located within the physical environment of the user in the video at the corresponding grid cell; and
    providing the data structure for route generation of routes or paths to one or more of the items or the objects when the mapping session ends.

2. The method of claim 1, wherein instructing further includes capturing a unique second anchor point for each corresponding grid cell based on a particular object detected within the physical environment from the video.

3. The method of claim 2, wherein instructing further includes instructing the user to capture within the video an item code associated with each item at the corresponding grid cell.

4. The method of claim 3, wherein instructing further includes calculating a distance and a direction between each item at the corresponding grid cell based on the item code and the video and associating a corresponding distance and a corresponding direction within the data structure to the corresponding grid cell and each corresponding item code.

5. The method of claim 1 further comprising, the method of one or more additional mapping sessions and revising the data structure based on the one or more mapping sessions.

6. The method of claim 1 further comprising:
    receiving a recorded video for an AR routing session associated with an actual route taken to one or more particular items within the indoor location; and
    updating the data structure based on the particular items and the actual route taken.

7. The method of claim 1 further comprising:
    identifying available walking paths through the indoor location from the data structure; and
    associating the available walking paths with the data structure.

8. The method of claim 1 further comprising dynamically causing the video viewed by the user through the user device of the physical environment to include a superimposed rendering of the grid and corresponding connected grid cells as the user travels through the indoor location and as the data structure is being generated and revised during the mapping session.

* * * * *